United States Patent

[11] 3,588,149

| [72] | Inventors | Henry William Demler, Sr.<br>Lebanon;<br>Edward Landis Weist, Hershey, Pa. |
|---|---|---|
| [21] | Appl. No. | 858,241 |
| [22] | Filed | Aug. 13, 1969 |
| [45] | Patented | June 28, 1971 |
| [73] | Assignee | AMP Incorporated<br>Harrisburg, Pa.<br>Continuation-in-part of application Ser. No. 690,896, Dec. 15, 1967, now abandoned. |

[54] VACUUM OR PRESSURE COUPLING DEVICES
1 Claim, 15 Drawing Figs.

[52] U.S. Cl. .......................................... 285/110,
285/137, 285/307, 285/331
[51] Int. Cl. ....................................... F16l 47/00,
F16l 39/00
[50] Field of Search .......................... 285/319,
317, 110, (S.F. Digest), 331

[56] References Cited
UNITED STATES PATENTS

| 32,135 | 4/1961 | Jones ........................... | 285/110 |
| 1,284,358 | 12/1918 | Kelley .......................... | 285/319 |
| 3,245,703 | 4/1966 | Manly .......................... | 285/S.F. |
| 3,394,954 | 7/1968 | Sarns ........................... | 285/319 |
| 3,455,579 | 7/1969 | Olliff, Jr., et al. ............. | 285/319X |
| 3,469,863 | 9/1969 | Riester et al. ................. | 285/319X |
| 3,473,833 | 10/1969 | Bremer ........................ | 285/331X |

FOREIGN PATENTS

| 376,732 | 5/1964 | Switzerland ................. | 285/S.F. |

Primary Examiner—Thomas F. Callaghan
Attorneys—Curtis, Morris and Safford, Marshall M. Holcombe, William Hintze, William J. Keating, Frederick W. Raring, John R. Hopkins, Adrian J. La Rue and Jay L. Seitchik ABSTRACT: A vacuum or pressure coupling device comprises mateable body members each provided with means for connection to tubular members and each provided with means for maintaining the body members in engagement, one of the body members being provided with a stiffly flexible sealing member which is sealingly and telescopically mateable with a section of another of the body members.

PATENTED JUN28 1971

INVENTORS
HENRY WILLIAM DEMLER SR.
EDWARD LANDIS WEIST

BY Adrian J. LaRue

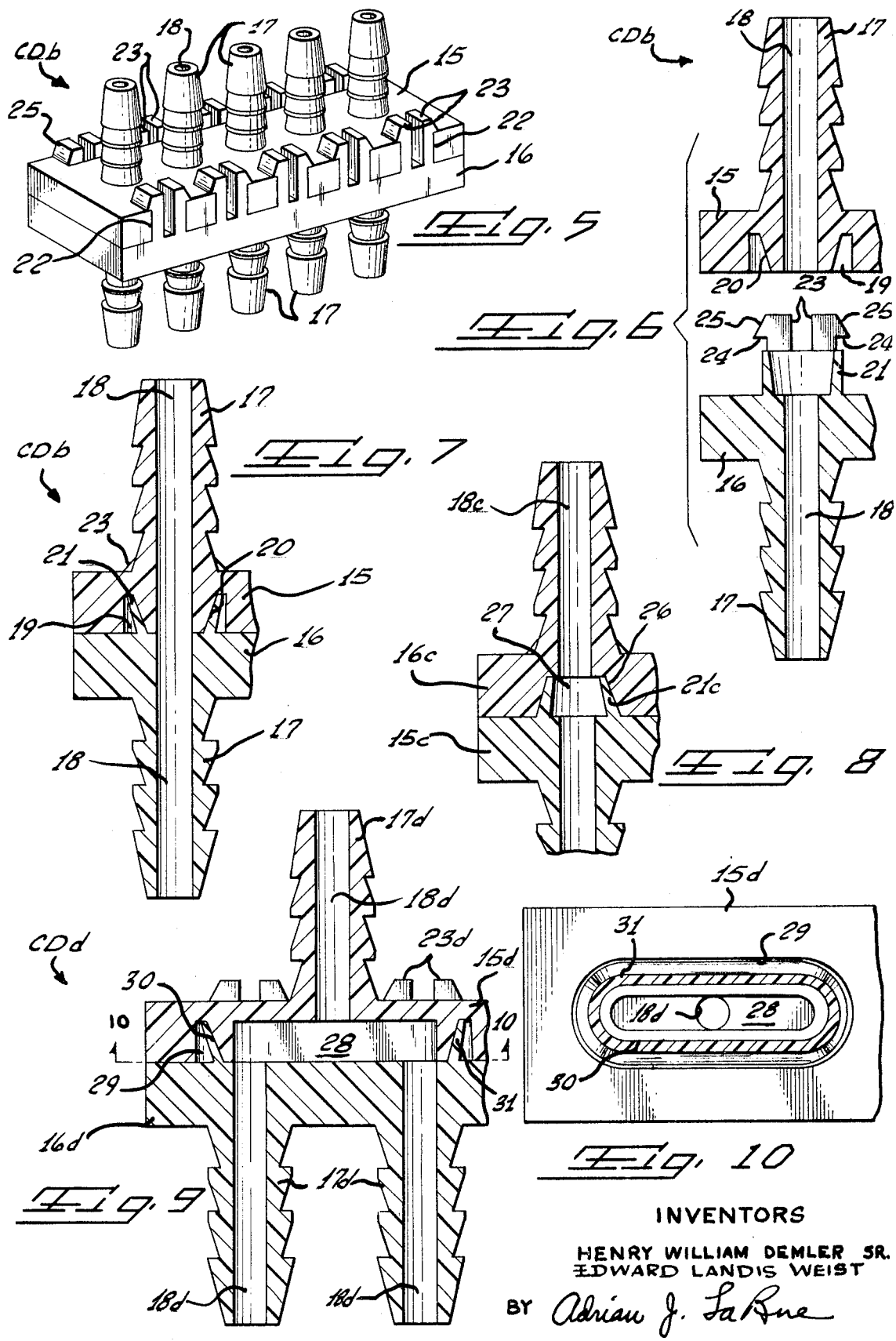

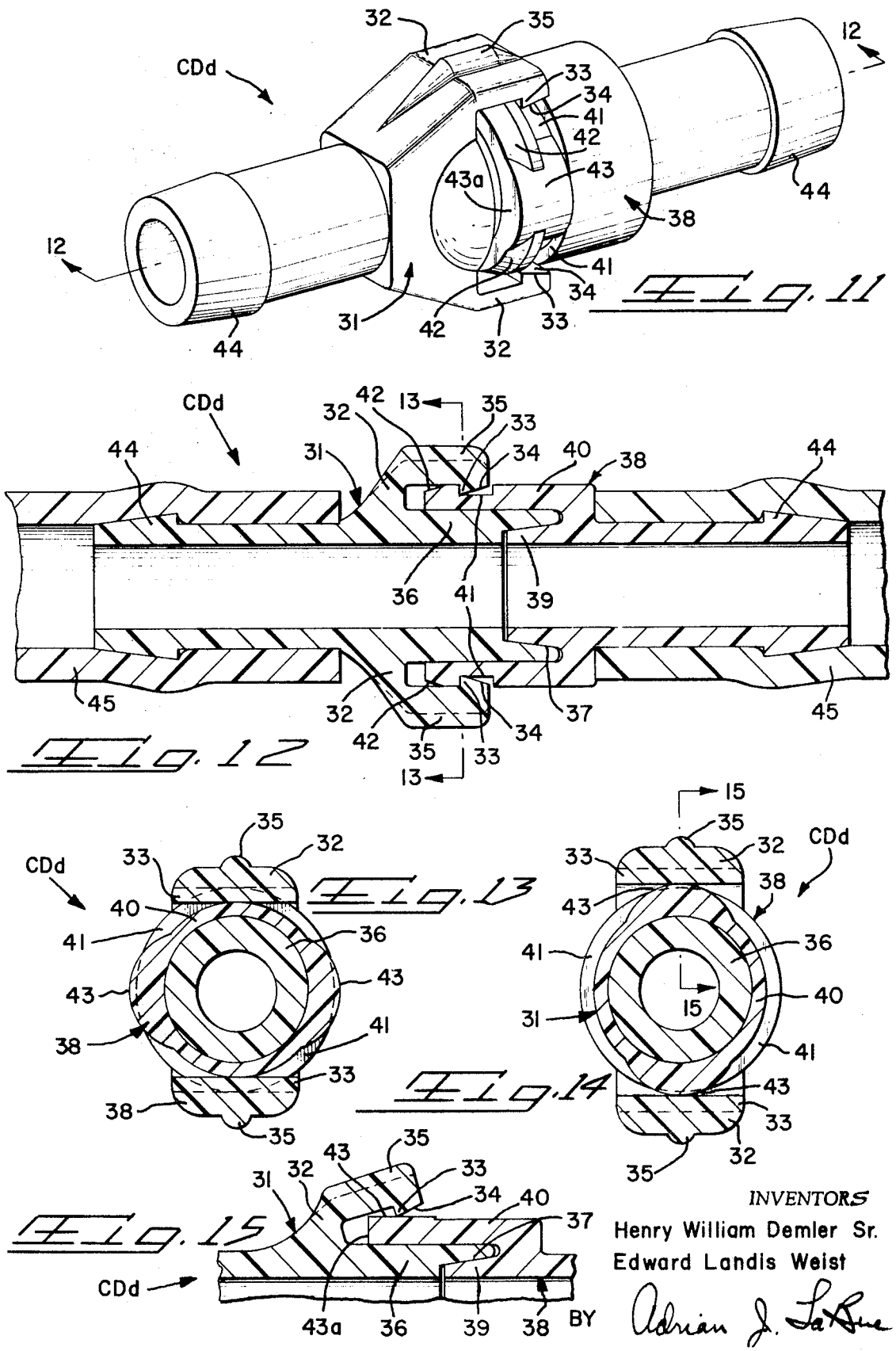

VACUUM OR PRESSURE COUPLING DEVICES

CROSS REFERENCE TO RELATED APPLICATION

This application is a continuation-in-part application of Ser. No. 690,896, filed Dec. 15, 1967 and now abandoned.

This invention relates to coupling devices for connecting tubular members together and more particularly to coupling devices for connecting vacuum or pressure lines.

In the field of vacuum or pressure lines they are generally connected to a source of vacuum or pressure by coupling devices of complicated construction which can be a permanent connection or a quick-disconnect connection. Such coupling devices include several pieces to effect the connection and they are expensive.

An object of the present invention is to provide a vacuum or pressure coupling device having telescopically mateable parts with one of these parts being a stiffly flexible sealing means.

Another object of the invention is the provision of a vacuum or pressure coupling device having means to sealingly maintain the parts together and to permit the parts to be readily separated.

A further object of the invention is to provide a vacuum or pressure coupling device having multiple inlets in communication with respective outlets.

An additional object of the invention is the provision of having integral sealing means.

A still further object of the invention is to provide a vacuum or pressure coupling device having means for latching parts of the coupling device together in a simple manner without the aid of intricate latching devices and/or tooling.

Still an additional object of the invention is the provision of a vacuum or pressure coupling device having a construction defining a manifold.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

In the drawings:

FIG. 5 is a perspective view of another embodiment;

FIG. 6 is an exploded and partial cross-sectional view of the elements of FIG. 5;

FIG. 7 is a view similar to FIG. 6 with the elements in engagement;

FIG. 8 is a partial cross-sectional view of an additional embodiment;

FIG. 9 is a partial cross-sectional view of a further embodiment;

FIG. 10 is a view taken along lines 10-10 of FIG. 9;

FIG. 11 is a perspective view of a further embodiment;

FIG. 12 is a view taken along lines 12-12 of FIG. 11 with the coupling device connected to tubular members;

FIG. 13 is a view taken along lines 13-13 of FIG. 12 illustrating the coupling device in a coupled position;

FIG. 14 is a view similar to FIG. 13 illustrating the coupling device in a position for decoupling; and FIG. 15 is a view taken along lines 15-15 of FIG. 14.

Figure 1:
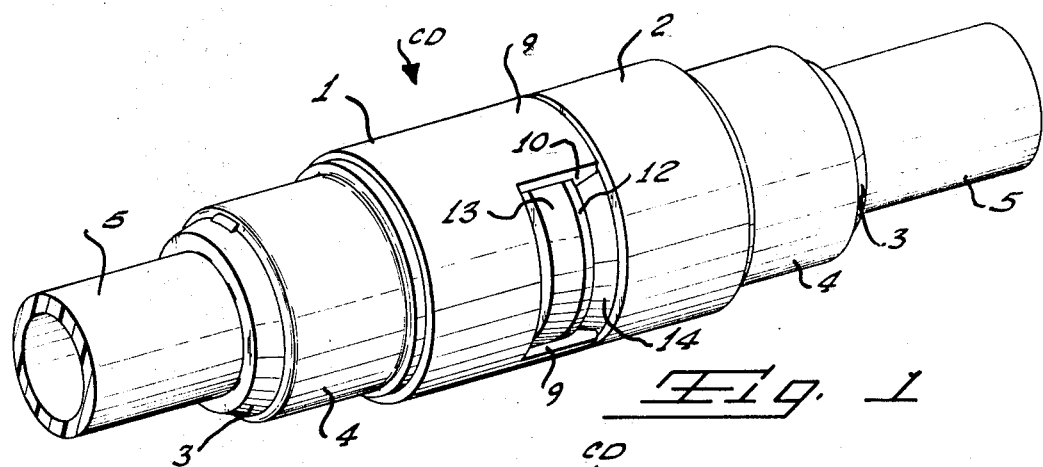
FIG. 1 is a perspective view of a vacuum coupling device with parts in position.
Figure 2:
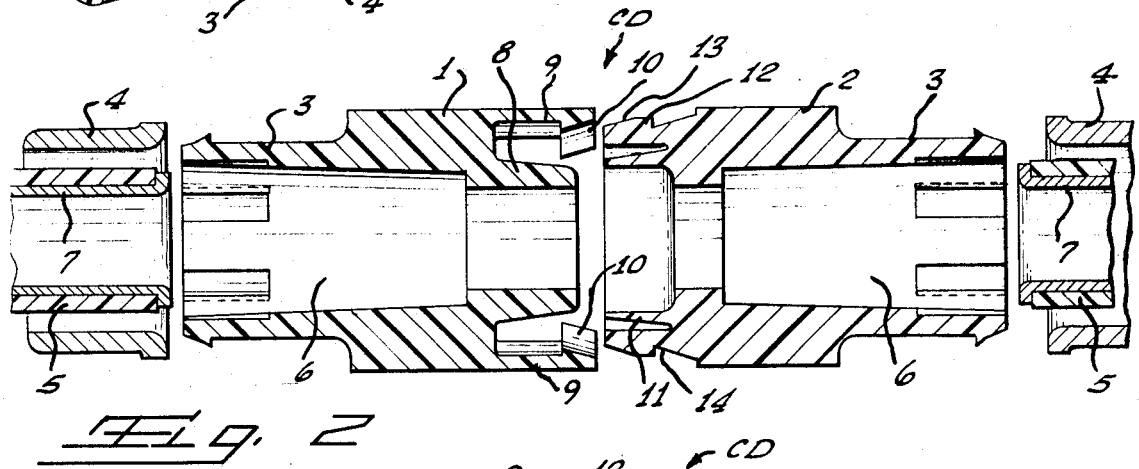
FIG. 2 is a cross-sectional view of the elements of FIG. 1 in an unassembled condition.
Figure 3:
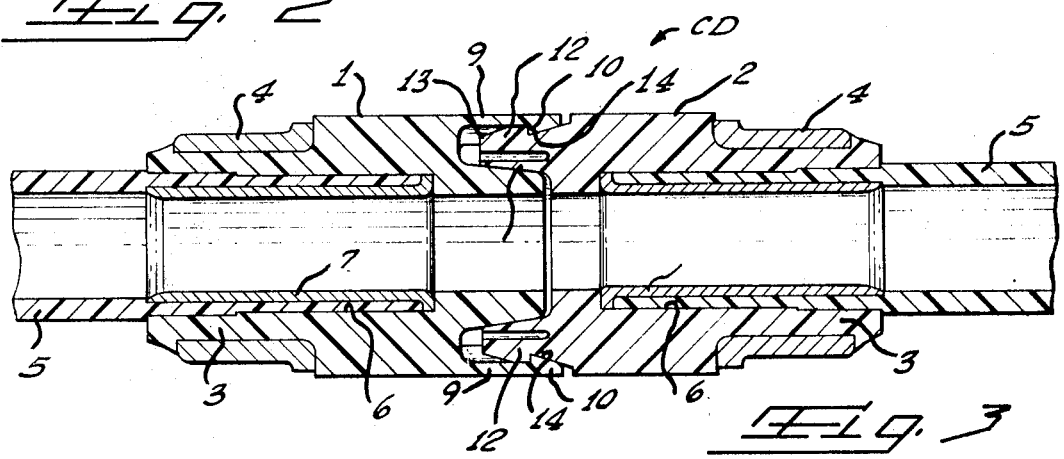
FIG. 3 is a longitudinal cross-sectional view of FIG. 1.

Turning now to the drawings and especially FIGS. 1 through 3, a vacuum coupling device CD comprises mateable body members or parts 1 and 2. Each part is provided with a section 3 on which ferrule 4 is disposed which is reduceable in diameter when the ends of tubular members 5 are positioned within openings 6 of parts 1 and 2 to secure sections 3 to the ends of the tubular members. Sections 3, ferrules 4, and the configuration of openings 6 correspond to securing means for securing onto the ends of tubular members which is completely disposed in applicant's copending application, Ser. No. 517,747 filed Dec. 30, 1965, and assigned to the present assignee.

If tubular members 5 are plastic material or soft metal, inserts 7 are preferably disposed therein in order to provide backup pressure when ferrules 4 are reduced in diameter. If, on the other hand, tubular members 5 are of hard material, no inserts are necessary. Other means for securing parts 1 and 2 onto tubular members other than that disclosed can, of course, be used to secure the parts to the tubular members such as, for example, barbed sections for insertion into the ends of rubber hoses.

Part 1 is provided with an annular member 8 having a tapered exterior surface. Stiffly flexible latching legs 9 extend outwardly from the same end from which annular member 8 extends and they are spaced outwardly from annular member 8 as well as therealong. Latching legs 9 have an arcuate configuration in cross section and they are provided with inwardly directed latching members 10 which are provided with a beveled surface.

Part 2 is provided with an integral stiffly flexible sealing member 11 which is telescopically and sealingly mateable with annular member 8 when parts 1 and 2 are latchably mated as illustrated in FIG. 3. Sealing member 11 is tapered in cross section with the thinnest part thereof being at the outermost end of the sealing member. Concentric with sealing member 11 is an annular hood 12 having a beveled surface 13 and an annular depression 14.

In assembly, parts 1 and 2 are pushed together in an axial direction with annular member 8 being telescopically disposed within sealing member 11 and the outer beveled surfaces of latching members 10 are cammed over beveled surface 13 of annular hood 12 until latching members 10 latchably engage annular depression 14 thereby sealingly latching parts 1 and 2 together as illustrated in FIG. 3. Since sealing member 11 is tightly engaged with the outer tapered surface of annular member 8 and tubular members 5 are connected to a vacuum environment, sealing member 11 is drawn tightly against annular member 8 as a result of the vacuum environment thereby rendering the seal between sealing member 11 and annular member 8 more effective.

Since depression 14 is annular, latching members 10 engage therewithin at any position therearound thereby precluding any specific areas of engagement between parts 1 and 2. In order to disconnect parts 1 and 2 from one another, force is applied at right angles to the axis of parts 1 and 2 thereby causing latching legs 9 to be disengaged from annular depression 14 via a camming action so that the parts can now be disengaged from each other.

Figure 4:
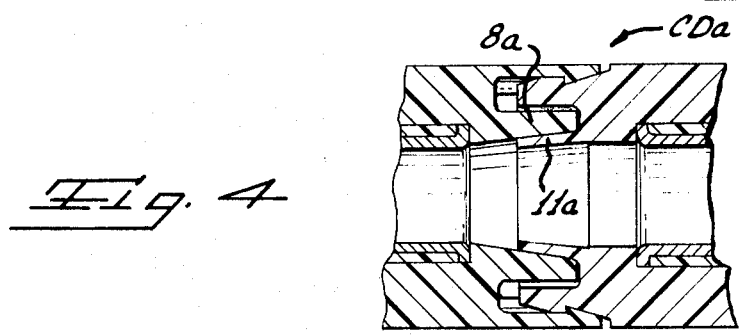
FIG. 4 is a partial cross-sectional view similar to FIG. 3 illustrating an alternative embodiment.

FIG. 4 illustrates coupling device CDa which is similar in construction to coupling device CD except that coupling device CDa is used in a pressure environment instead of a vacuum environment. Annular member 8a of FIG. 4 has the interior surface tapered and stiffly flexible sealing member 11a is arranged so as to be snugly disposed in a telescopic manner within the inner tapered surface of annular member 8a and the pressure of the fluid presses sealing member 11a tightly against the tapered surface of annular member 8a thereby rendering the seal therebetween more effective. The rest of coupling device CDa is otherwise similar in construction to coupling device CD and no further discussion of coupling device CDa is necessary.

FIGS. 5 through 7 illustrate coupling device CDb which is another embodiment. This embodiment includes part 15 which is mateable with part 16. Both parts are in the form of plates provided with barbed sections 17 onto which hoses are sealingly secured. Barbed sections 17 are provided with openings 18 extending therethrough. Annular depressions 19 are disposed in part 15 concentric with each opening 18 and the inner wall 20 of each annular depression 19 is tapered so that each opening 18 in part 15 has an annular section similar to annular section 8. Stiffly flexible sealing members 21 extend outwardly from part 16 concentric with each of openings 18. Sealing members 21 are tapered and are telescopically mateable within respective annular depressions 19 of part 15 and they are sealingly engageable with inner walls 20 when parts 15 and 16 are brought into engagement. Coupling device CDb is used in conjunction with a vacuum source which forces sealing members 21 into tight engagement with inner walls 20 thereby providing an effective seal therebetween.

Recesses 22 are disposed in each side of part 15 at spaced intervals therealong. A pair of integral latching legs 23 extend outwardly from part 16 at spaced locations therealong corresponding to the spacing of recesses 22. Latching legs 23 are stiffly flexible and are provided with latching sections 24 and tapered configurations provided by beveled surfaces 25. Latching legs 23 are spaced apart a distance so that the distance between the outer surfaces corresponds to the width of recesses 22 in order to be fittable therein.

When parts 15 and 16 are moved into engagement with each other they are latched together via pairs of latching legs 23 mateable with respective recesses 22 as illustrated in FIG. 5. Beveled surfaces 25 cause latching legs 23 to be moved toward each other during the movement of latching legs 23 along recesses 22, and, when parts 15 and 16 come into engagement, latching sections 24 engage the top surface of part 15 under the influence of the spring characteristics of latching legs 23 thereby latchably securing parts 15 and 16 together without the aid of any tools or extra securing members; however, other securing means such as, for example, screws, nuts, and bolts or the like, may, of course, be used to secure parts 15 and 16 together.

FIG. 8 illustrates coupling device CDc which is similar in every respect to coupling device CDb except that a stiffly flexible sealing member 21c is sealingly forced against tapered wall 26 of an enlarged section 27 of opening 18c when parts 15c and 16c are secured together. When coupling device CDc is to be used in conjunction with a pressure environment so that the pressure of the fluid will force sealing member 21c against tapered wall 26, the embodiment of FIG. 8 is therefore similar to the embodiment of FIG. 4 and enlarged section 27 and tapered wall 26 constitute an annular section similar to annular section 8a.

FIGS. 9 and 10 illustrate coupling device CDd which is a still further embodiment of the invention. Coupling device CDd is similar in construction to coupling device CDb except that the opening 18d of a barbed section 17d is in communication with enlarged recess section 28 which is oblong in configuration. Surrounding enlarged section 28 in a concentric manner is an oblong depression 29 having an inner tapered wall 30. Stiffly flexible sealing member 31 has an oblong configuration surrounding in a concentric manner openings 18d of barbed sections 17d on part 16d. When parts 15d and 16d are latchably secured together via latching legs 23d, sealing member 31 is disposed in oblong depression 29 snugly against tapered wall 30 and openings 18d of part 16d are in communication with enlarged section 28 so that two openings of part 16d are in communication with one opening of part 15d in a vacuum environment. Thus, barbed sections 17d of part 15d is connected to a source of vacuum while barbed sections 17d on part 16d are connected to members to be operated by a source of vacuum. Of course, more than two openings of 18d can be in communication with a single opening in accordance with the teaching of the present invention. Stiffly flexible sealing member 31 can be biased against a tapered wall in the manner of the embodiments of FIGS. 4 and 8 in order to be used in connection with fluid under pressure and this need not be illustrated, since such construction can be readily visualized when considering the embodiments of FIGS. 4, 8, 9 and 10.

FIGS. 11—15 illustrate coupling device CDd which is a still additional embodiment of the invention and it is similar in configuration to coupling device CD, FIGS. 1—4. Stiffly flexible latching legs 32 of body member 31 are provided with inwardly directed latching members 33 each of which has a beveled surface 34. A rib 35 is provided on each leg 32 to strengthen same. A tubular section 36 is spaced inwardly from legs 32 and it extends outwardly beyond these legs, a tapered sealing surface 37 being located along an outer end thereof.

Body member 38 is provided with a flexible sealing member 39 and a tubular section 40 concentric therewith. Diametrical latching grooves 41 are provided in section 40 which receive latching members 33 of latching arms 32 to maintain tubular sections 36 and 40 telescopically mated so that sealing surface 37 and sealing member 39 are maintained in sealing engagement. Arcuate beveled surfaces 42 are located at the front end of body member 38 to be engaged by beveled surfaces 34 of latching members 33 when members 31 and 38 are axially moved together and this action causes arms 32 to be cammed outwardly thereby facilitating latching members 33 seating within latching grooves 41 to securely latch members 31 and 38 together.

Arcuate projections 43 are disposed in a diametrical manner on body member 38 and they are in communication with grooves 41. Projections 43, when engaged by latching members 33 upon members 31 and 38 being rotated relative to one another, effect a camming operation thereby moving latching arms 32 away from the longitudinal axis of members 31 and 38 and freeing latching members 33 from grooves 41 and this action permits members 31 and 38 to be moved free of each other. Projections 43 extend slightly above the outside surface of section 40 to assure that latching members 33 are moved free and clear of grooves 41 so that members 31 and 38 can readily be moved free of one another. The configuration of projections 43 is such that the members 31 and 38 can be rotated in either direction.

The thickness of the section of tubular section 36 containing sealing surface 37 is such that it is wedgingly disposed between the inside surface of tubular section 40 and stiffly flexible sealing member 39 thereby effecting an excellent seal therebetween especially under a pressure environment. An arrangement such as illustrated in FIGS. 1—3 can be utilized in the case of a vacuum environment.

Barbed sections 44 are provided by members 31 and 38 in order to connect to flexible tubular members 45; however, the tubular members 45 can be connected to members 31 and 38 via the teaching of FIGS. 1—3, if desired.

Projections 43 are provided with flat surfaces 43a at the front ends thereof to prevent the body members from being engaged in a manner so that latching members 33 are disposed on projections 43 which is a nonlatched position.

It will, therefore, be appreciated that the aforementioned and other desirable objects have been achieved; however, it should be emphasized that the particular embodiments of the invention, which are shown and described herein, are intended as merely illustrative and not as restrictive of the invention.

We claim:

1. A vacuum or pressure coupling device comprising: a pair of mateable body members provided with means for connecting each of said body members to an end of a tubular member, one of said body members having a stiffly flexible annular sealing member at a front end thereof, said sealing member being unitary with said one of said body members, another of said body members having at a front end thereof an annular area provided with a tapered surface, said sealing member and said annular area telescopically and sealingly mateable with each other when said front ends of said body members are mateably connected together with said sealing member tightly engaging said tapered surface in a sealing manner, stiffly flexible latching arm means extending outwardly from said front end of said one of said body members and being unitary therewith, recess means disposed in the other of said body members, said latching arm means engaging in said recess means when said sealing member and said annular area are telescopically mated in order to latch said body members matingly together, camming means provided on said other of said body members for engagement by said latching arm means when said body members are rotated relative to one another, said camming means camming said latching arm means out of engagement with said recess means enabling said body members to be disconnected from one another, projection means provided at said camming means and initially registrable by said latching arm means for preventing said body members to matingly engage, and beveled surfaces adjacent said projecting means and initially registrable by said latching arm means, said surfaces camming outwardly said latching arm means facilitating latching of said latching arm means within said recess means.